United States Patent Office

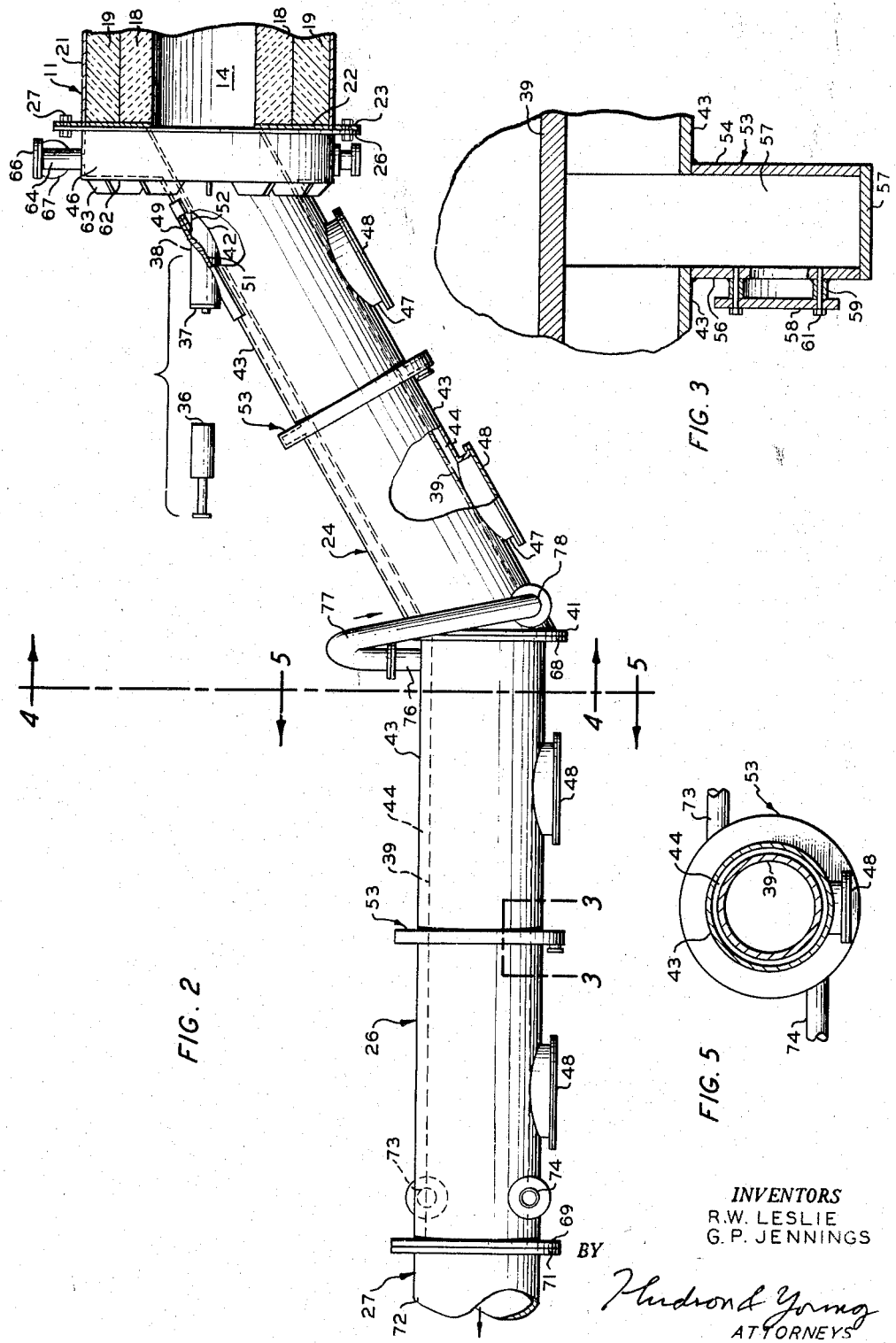

2,873,172
Patented Feb. 10, 1959

2,873,172

PROCESS AND APPARATUS FOR MAKING CARBON BLACK AND QUENCHING SMOKE FROM CARBON BLACK FURNACES

Robert W. Leslie and George Peter Jennings, Bristol, England, assignors to Phillips Petroleum Company, Bartlesville, Okla., a corporation of Delaware Application November 23, 1955, Serial No. 548,683

16 Claims. (Cl. 23—209.4)

This invention relates to processes and apparatus for making carbon black and quenching the effluent smoke, which smoke contains combustion gases and suspended carbon black, from any of the conventional types of carbon black producing furnaces operating by incomplete combustion, and/or pyrolysis, of hydrocarbons. In one aspect it relates to quenching the smoke to a temperature preventing further reaction in which the amount of water vaporized in the smoke is reduced to a minimum. In another aspect it relates to regulating the temperature of the smoke going to the conventional gas and solids separation system to a temperature suitable for optimum operation of said separation system. In another aspect it relates to producing a gas of lower water content, and thereby higher fuel content, as a by-product of the separation system. In another aspect it relates to a water jacket heat-exchanger-quench in which water stagnation, sedimentation, and scale formation is reduced to a minimum.

In the prior art as exemplified by the patents to Krejci 2,564,700, August 21, 1951, and 2,641,534, May 5, 1953, the effluent smoke from the carbon black furnace is quenched by the immediate and direct injection of a spray of water into the same. While the pipe surrounding the water injection pipe may be water jacketed, such water jacket cooling is provided merely to prevent the pipe containing the water injection pipe from becoming too hot, and such water jacket cooling is minor compared to the amount of cooling caused by the direct water injection into the smoke. In the present invention the water jacket is extensive and provides a substantial portion of the primary quenching, while the direct injection of water is downstream of the same and is primarily provided for temperature regulations. As the result, the amount of water employed in the direct water spray quench and thereby vaporized in the gas in the present invention is only one half as much as employed in the prior art, which results in the separated gas having more B. t. u. and less water vapor per pound and being thereby more useful for fuel. The volume of gas is thereby reduced by 20%, which increases the effective capacity of the carbon black separation system, bag filter, and the capacity of the entire plant by 20%.

In any water jacket there is a tendency for salts and solid impurities in the cooling water, along with any rust or corrosion of said water jacket by said cooling water, to form scale, sediment, and water-insoluble salts on the internal surfaces of the water jacket, tending to plug the same, even if the hardness of the water is only 10 parts per million, but the present invention avoids such accumulation of scale and sediment by injecting the water tangentially into the cooling jacket and maintaining circulation in all parts thereof.

In the cooling jackets of the prior art there is a considerable problem because of unequal expansion of inner and outer walls due to heating and cooling whenever the furnace is started or stopped and there is a tendency for the end plate of the furnace to warp due to differences in temperature at different points therein, but the present invention provides a novel expansion joint for the outer wall of the heat-exchanger water jacket, and obviates warping of the end plate of the furnace by keeping all of the same at approximately the same temperature, and below the boiling point of water at the pressure involved.

One object of the present invention is to provide a novel process of making carbon black, and novel apparatus to carry out said process.

Another object is to provide an improved process, system, and apparatus for quenching the effluent smoke from a carbon black furnace below the temperature of further reaction.

Another object is to produce as a by-product a fuel gas of lower water content, and increased B. t. u. content.

Another object is to increase the capacity of such carbon black processes, systems, and apparatus.

Another object is to provide an improved water jacket heat-exchanger-quench for a carbon black furnace in which sedimentation and scale formation is reduced to a minimum, unequal expansion of the inner and outer walls of the water jacket is compensated for by an improved expansion joint, and which is designed to keep the end plate of the carbon black furnace from warping.

Numerous other objects and advantages will be apparent to those skilled in the art upon reading the accompanying drawings, specifications and claims.

In the drawings:

Figure 1 is an elevational diagrammatic view, with parts broken away to shorten the same, showing an illustrative embodiment of the invention applied to a conventional carbon black furnace.

Figure 2 is an elevational view with parts in section to show details of construction of the water jacket heat-exchanger-quench of Figure 1, with the furnace, and the atmospheric cooling pipe broken away and the water inlet and outlet pipes disconnected.

Figure 3 is a cross sectional elevational view of a portion of Figure 2 inside the line 3—3 showing details of the construction of the expansion joint.

Figure 4 is a cross sectional view of Figure 2 taken along the line 4—4 looking in the direction indicated.

Figure 5 is a cross sectional view of Figure 2 taken along the line 5—5 looking in the direction indicated.

In Figure 1 is shown a carbon black furnace generally designated as 11 to which the present invention is applied. Carbon black furnace 11 may be any conventional type producing an effluent smoke comprising combustion gases and suspended carbon black particles, such as any of those in the aforementioned Krejci patents, or any of those classified in Class 23, subclasses 209.4 or 209.6, or any similar furnace. In such furnaces, a hydrocarbon fuel 12 and/or 13, entering the furnace chamber 14 tangentially and/or axially in a gaseous state, or sprayed therein as a finely divided liquid spray, is converted therein into a hot smoke. This conversion is by partial combustion and/or pyrolysis of said hydrocarbon in the presence of a hot combustion gas which may be separately produced and injected into the furnace (not shown), but which preferably is formed in the furnace by partial combustion of fuel, such as hydrocarbon gas, or oil, with a free-oxygen containing gas, generally air 16 and/or 17, but which may be in some instances oxygen enriched air, pure oxygen, or synthetic mixtures of combustion gas, or other inert gas, mixed with free oxygen, especially if the gas 33 is to be used as synthesis gas of low nitrogen content. The operation of such furnaces is well understood and the present invention applies to all of them, as long as a hot smoke emerges from chamber 14.

As shown in Figure 2, furnace 11 is generally constructed of an inner refractory tube 18, which for economy is generally surrounded by less expensive heat insulating material 19, which in turn is surrounded by a supporting metal case 21. The effluent end of the furnace is protected by annular internal and external flanges 22 and 23, respectively. The internal flange 22 serves to protect the refractory and heat insulating materials 18 and 19 especially when the water jacket generally designated as 24 is removed. Considerable difficulty has been experienced in the prior art because of warping of flange 22 due to uneven heating and cooling of different portions of the same. The external flange 23 serves as a means to connect to the water jacket 24, by means of a corresponding adjacent flange 26 secured to the water jacket. Flanges 23 and 26 may be secured together by any means such as conventional nuts and bolts 27, only one of which is shown in order to simplify the drawings.

As shown best in Figure 1, the present invention comprises passing the effluent smoke from chamber 14 of carbon black furnace 11 directly into one or more water jacket heat-exchanger sections generally designated as 24 and 26, and then through an atmospheric cooling and water spray section generally designated as 27 containing direct water spray quench 28, from which the smoke then passes into a water spray cooling tower 29 and then through a conduit 31 to any conventional gas and solids separation system generally designated as 32, from which fuel gas of lower water content is removed through conduit 33, and from which the fluocculent carbon black powder is removed through conduit 34 for sale, or further processing, such as pelleting (not shown).

Gas-solid separator 32 may be any conventional system (not shown) for separating carbon black from the smoke, and may consist of bag filter (not shown) alone, or an electrical precipitator acting as an agglomerator followed by one or more cyclone separators and/or bag filters (not shown). In place of an electrical precipitator, a sonic agglomerator (not shown) can be employed. In brief, carbon black furnace 11 and carbon black separation and collection system 32 are both conventional, but between the two, and forming a combination therewith, are the novel devices 24, 26, 27, 29 and 31 embodying the present invention.

The heat-exchanger sections 24 and 26 are shown on an enlarged scale in Figure 2. Water jacket 24 preferably has its axis inclined downwardly from furnace axis for several purposes, one of which is to enable inspection of the furnace through a telescope or optical pyrometer 36 aligned with the axis of chamber 14 whenever cover 37 is removed from a sight tube 38 aligned with a tube 52 passing through the walls of heat-exchanger 24. While such operations can be made with burning gases emerging through sight tube 38, it is preferred to shut off the fuel and air to the furnace momentarily, open cap 37, make an immediate observation with pyrometer 36, replace cap 37, and turn the air and fuel back on for immediate re-ignition in the furnace, the walls of which are incandescent for an appreciable period of time after the flow of air and fuel are interrupted, and which easily re-ignite the same when flow is resumed.

Heat-exchanger 24 comprises an inner tube 39 of a diameter corresponding roughly to that of chamber 14, which inner tube 39 is secured to the inner edge of annular flange 26 to form an opening connected to chamber 14 for receiving the smoke therefrom. The other end of tube 39 is similarly secured to annular flange 41 to be connected in communication with a similar passage in heat-exchanger 26 to discharge the smoke thereinto. Tube 39 is cylindrical and imperforate except at 42 where it is perforated in alignment with sight tube 38. Heat-exchanger 24 has an outer tube 43 spaced from and concentric with tube 39, and surrounding the same to provide a water chamber 44, tube 43 being secured to flange 41, and through enlarged housing 46 to flange 26 so that water space 44 is completely enclosed. The tube 43 is provided in its lower portion with clean-out openings 47 closed by removable covers 48, which may be secured by any means, such as nuts and bolts like 27 (not shown). The wall of 43 also contains an opening 51 covered by annular plate 49 to the annulus of which is secured sight tube 38. Connecting inner tube 39 and outer tube 43 around openings 42 and 51 is a tube 52 which seals the water in space 44 and provides communication between chamber 14 and sight tube 38.

In the central portion of tube 43 is provided an expansion joint generally designated as 53, details of which are shown on an enlarged scale in Figure 3. Generally one such expansion joint is enough, but obviously a plurality may be employed if desired. In Figure 3 the outer tube 43 is interrupted and the expansion joint 53 connects the interrupted sections by means of annular outwardly extending radial flanges 54 and 56 connected thereto and connected together by a larger diameter tube 57. This expansion joint is desirable because inner tube 39 is at the same temperature as the outer tube 43 before the furnace is started, but after the furnace has been running tube 39 is considerably hotter than tube 43, and expands longitudinally relative thereto. This would throw considerable stress on the heat-exchanger 24 tubes 38 and 43 and flange 41 were it not for expansion joint 53. Expansion joint 53 allows sections 43 to move apart the distance required by the thermal expansion of tube 39, as plates 54 and 56 warp slightly to take up the stress resulting therefrom. As enlarged chamber 57 of joint 53 is a place in which sediment may collect, it acts as a trap for the same, and the sediment may be removed when desired, preferably when the furnace is shut down, by removing cover plate 58 from access opening 59 to which it is secured by conventional fastening means, such as screws 61.

Because of the large diameter of enlarged end 46 it is desirable to reinforce the end plate 62 by such means as radially disposed reinforcement flanges 63 secured thereto preferably by welding.

Water space 44 in enlarged end 46 communicates with discharge T 64 one end of which is closed by blind flange 66 and the other end of which has a flange 67 for connection to a discharge line for the hot water produced in space 44.

Section 26 is similar in construction to section 24, except that it is preferably disposed on a horizontal longitudinal axis parallel to that of the furnace 14, and it does not contain any sight tube 38. Section 26 has a continuation of annular water jacket space 44 between an inner tube 39 and an outer tube 43, said tubes being sealed at their ends to flange 68 secured by any suitable means, such as bolts (not shown) to similar flange 41, and to flange 69 secured in like manner to flange 71 of the atmospheric cooling pipe 72 of section 27 (shown more fully in Figure 1).

It will be noted that section 26 is also provided with an expansion joint 53 and cleanout doors 48, and when viewed in cross section along the line 5—5 looking in the direction indicated, it appears as shown in Figure 5.

As hot water is lighter than cold water, it is desired to take advantage of this principle in passing the water through water jackets 26 and 24. The water is introduced into annular space 44 of water jacket 26 through one or more pipes 73 and/or 74 disposed to direct the water into space 44 in a direction generally tangential to the surface of pipes 39 and 43. This causes the water in space 44 to whirl in a counter-clockwise helical path as viewed in Figure 5, the water proceeding from the end of section 26 adjacent flange 69 to the end adjacent flange 68, at which point an outlet conduit 76 is provided communicating with space 44 through pipe 43. While pipe 76 could also be tangentially disposed relative to pipe 43, it is preferred to have it extend radially and vertically as shown from the uppermost portion of pipe 43 so as to obviate the possibility of any gas accumulating in the top of space 44, which gas might cause local overheating or corrosion. Any gas which passes into restricted diameter pipe 76 will be swept through the upwardly and downwardly curving pipe 77 along with the water and will enter the space 44 of section 24 through pipe 78 in a direction tangential to the surface of pipes 39 and 43. The water then proceeds in a helical path through space 44, passing around pipe 52 into the enlarged housing 46 and out through T 64 and pipe 67.

Returning to Figure 1, cold water 79 is supplied to pipe 81 in amounts depending upon the position of valve 82, from which it is distributed to inlet pipes 73 and 74. Valve 82 may be set by hand from time to time after visual observation, or tests with a common thermometer (not shown) of the temperature of hot water 67, and excellent results are obtained in such practice of the invention. However, in large commercial operations it is preferable to employ a conventional temperature control recorder 83, a number of which are available on the market, to control the opening of valve 82 as indicated by the dotted line 84. The control 83 is set to maintain the temperature of hot water 67 at a temperature somewhat below the boiling point at the pressure involved, for example 180° F., and the temperature of the cold water 79 may be any lower temperature, generally about atmospheric temperature. While not shown, it is obvious that cold water 79 may be in part supplied by cooling hot water 67 in suitable atmospheric cooling towers, and recycling the same to 79.

While water jackets 24 and 26 provide a substantial portion of the primary quenching of the smoke passing therethrough to a temperature below that of further reaction, generally they will not be able to supply sufficient cooling alone, and therefore will generally be supplemented by opening valves 86 and 87 allowing cold water to be supplied from 79 to pipes 88 and 89, especially in the summertime. When such is the case, conventional temperature controller recorders 91 and 92, respectively, downstream of their respective points of water injection regulate the flow of water through pipes 88 and 89 by means of valves 93 and 94, respectively. The water passing through pipe 88 passes through the wall of the atmospheric cooling section 27 where it is sprayed at 28 into direct contact with the smoke, cooling the same by being heated to the vaporization temperature and by the latent heat of vaporization as it all vaporizes.

The amount of water flowing through pipe 88 is generally regulated to that necesary to lower the temperature of the smoke below the temperature of continued reaction, and because this direct injection of water is downstream of the extensive water jacket sections 24 and 26 the amount of water that is injected through pipe 88 and 89 is only ½ as much as employed in said Krejci patents where the effluent smoke is quenched immediately by the direct injection of a spray of water, and the water jacket surrounding the water injection pipe is provided merely to prevent local overheating of the pipe.

The smoke then passes through atmospheric cooling section 27 and later through pipe 31 in a conventional gas and solid separation system generally designated as 32. It has been found in the prior art that such separation systems are sensitive to changes in temperature and to excess heating. Obviously if cloth, or plastic filter bags (not shown) are employed in separator system 32, the smoke contacting the same has to be below about 400° F. but preferably above 210° F. to prevent condensation of water vapor, and it has also been found that electrical precipitators (not shown) operate best at certain temperatures in agglomerating the carbon black. For these and other reasons it is desirable to have a water spray cooling tower 29 between and connecting pipes 27 and 31, because the atmospheric temperature in the winter is quite different than in summer, while the length of pipe 27 is the same. Also, the wind and rain which may contact pipe 27 will vary. This variation in temperature is not unduly great, but may be substantially eliminated by means of the temperature controlling regulator 92 controlling valve 94 to vary the amount of water sprayed through spray 96 in tower 29 so that the temperature of smoke in pipe 31 will be maintained as constant as desired and at the temperature desired. Because of the presence of pipe 27 which passes through the atmosphere and radiates heat to the same, the amount of water needed by spray 96 is relatively small.

*Example*

In a carbon black installation employing a carbon black furnace 11 and quench section 42 of the type shown in Krejci 2,641,534, Figure 2, the quench system of Figure 1 of the present application was substituted. Tests were made on the carbon blacks manufactured before and after this change and no difference could be detected in the abrasion resistance of two sets of rubber compounds each containing one of said different carbon blacks. The amount of quench water vaporized into the smoke was reduced by 50% from 300 to 150 gals./hour, which reduced the gas volume 20%. This reduction in the volume of gas handled by the separation system 32 enabled the addition of another new furnace, which resulted in an increase in plant output of 20% more carbon black. The temperature of the smoke is about as follows:

As it leaves furnace 14 and enters cooler 24 it is about 2700° F.

As it leaves cooler 24 before being sprayed at 28 it is about 1800° F.

In 27 after spray 28 has evaporated it is about 900° F.

As it leaves 27 into tower 29 it is about 700° F.

As it leaves tower 29 into pipe 31 it is about 450° F.

Another mode of practicing the present invention is to generate steam in either, or both, of cooling sections 24 and/or 26 and take steam, instead of hot water, off through line 67 and use the same to heat buildings, or to run a steam engine (not shown) to produce power, or generate electricity. When steam generation is practiced in either, or both, of cooling sections 24 and/or 26 they may be connected at their inlets 74 and 78 to separate sources of water and pipe 77 instead of leading from outlet 76 to inlet 78 would lead to a place of use of the hot water, or steam, produced in section 26. The steam may be produced as a vapor by evaporation of the water, or other cooling fluid, in cooling sections 24 and/or 26, or may be produced by reducing the pressure on the superheated hot water coming from outlets 67 and/or 77, by passing the same through a restriction, or valve, to an enlarged space (not shown) to allow the same to flash into steam, and the steam then employed in said engine or engines.

While a single gas conduit 39 has been shown, it is obvious that a plurality of parallel gas conduits could be employed in either or both of cooling sections 24 and/or 26.

While a specific embodiment of the present invention has been illustrated in the drawings and described in the specification for purposes of explaining the invention, it is obvious that the invention is not limited thereto.

The embodiments of this invention in which an exclusive property, or privilege, is claimed are defined as follows:

We claim:

1. A process of making carbon black comprising in combination pyrolyzing a hydrocarbon in a carbon black furnace to form an effluent smoke of carbon black particles suspended in a fuel gas, quenching said effluent smoke below the temperature of further pyrolytic reaction by first passing the same in countercurrent indirect heat exchange with liquid water having a temperature below its boiling point at its pressure without directly contacting said smoke with water during said indirect heat exchange, then passing said smoke through a zone in indirect heat exchange with the atmosphere and spraying water directly into said smoke in said zone, cooling the smoke further in said zone by indirect heat exchange with the atmosphere, cooling the smoke still further in said zone by spraying water directly into it, and separating said smoke into carbon black and fuel gas.

2. A process of making carbon black comprising in combination pyrolyzing a hydrocarbon in a carbon black furnace to form an effluent smoke of carbon black particles suspended in a fuel gas, quenching said effluent smoke below the temperature of further pyrolytic reaction by first passing the same in countercurrent indirect heat exchange with liquid water having a temperature below its boiling point at its pressure without directly contacting said smoke with water during said indirect heat exchange, then passing said smoke through a zone in indirect heat exchange with the atmosphere and spraying water directly into said smoke in said zone, cooling the smoke further in said zone by indirect heat exchange with the atmosphere, and separating said smoke into carbon black and fuel gas.

3. A process of making carbon black comprising in combination pyrolyzing a hydrocarbon in a carbon black furnace to form an effluent smoke of carbon black particles suspended in a fuel gas, quenching said effluent smoke below the temperature of further pyrolytic reaction by first passing the same in countercurrent indirect heat exchange with liquid water having a temperature below its boiling point at its pressure without directly contacting said smoke with water during said indirect heat exchange, then passing said smoke through a zone in indirect heat exchange with the atmosphere and spraying water directly into said smoke in said zone, cooling the smoke still further in said zone by spraying water directly into it, and separating said smoke into carbon black and fuel gas.

4. A process of making carbon black comprising in combination pyrolyzing a hydrocarbon in a carbon black furnace to form an effluent smoke of carbon black particles suspended in a fuel gas, quenching said effluent smoke below the temperature of further pyrolytic reaction by first passing the same in countercurrent indirect heat exchange with liquid water having a temperature below its boiling point at its pressure without directly contacting said smoke with water during said indirect heat exchange, then passing said smoke through a zone in indirect heat exchange with the atmosphere and spraying water directly into said smoke in said zone, and separating said smoke into carbon black and fuel gas.

5. A quench system for a carbon black furnace having an outlet for effluent smoke, comprising in combination an unobstructed generally cylindrical substantially uniform internal diameter effluent smoke conduit adapted to be connected in communication with said outlet of said furnace, a water jacket around said conduit on the end adapted to be connected to said furnace, said water jacket having a water outlet adjacent said furnace and a water inlet adjacent the other end of said water jacket, a first water spray in the unjacketed portion of said conduit adjacent said water jacket, a second water spray in the unjacketed portion of said conduit, means to supply water to said inlet of said water jacket and to each of said sprays in controlled amounts, temperature sensitive control means for regulating the water supply to said water jacket inlet to maintain a constant temperature adjacent said water jacket outlet, and separate temperature sensitive control means for regulating the water supply to each of said sprays to maintain a constant temperature at a control point downstream of each said respective spray.

6. A quench system for a carbon black furnace having an outlet for effluent smoke, comprising in combination an unobstructed generally cylindrical substantially uniform internal diameter effluent smoke conduit adapted to be connected in communication with said outlet of said furnace, a water jacket around said conduit on the end adapted to be connected to said furnace, said water jacket having a water outlet adjacent said furnace and a water inlet adjacent the other end of said water jacket, a water spray in the unjacketed portion of said conduit adjacent said water jacket, means to supply water to said inlet of said water jacket and to said spray in controlled amounts, temperature sensitive control means for regulating the water supply to said water jacket inlet to maintain a constant temperature adjacent said water jacket outlet, and temperature sensitive control means for regulating the water supply to said spray to maintain a constant temperature at a control point downstream of said spray.

7. A quench system for a carbon black furnace having an outlet for effluent smoke, comprising in combination an unobstructed generally cylindrical substantially uniform internal diameter effluent smoke conduit adapted to be connected in communication with said outlet of said furnace, a water jacket around said conduit on the end adapted to be connected to said furnace, said water jacket having a water outlet adjacent said furnace and a water inlet adjacent the other end of said water jacket, said water jacket containing no water sprays, a first water spray in the unjacketed portion of said conduit adjacent said water jacket, a second water spray in the unjacketed portion of said conduit, and means to supply water to said inlet of said water jacket and to each of said sprays in controlled amounts.

8. A quench system for a carbon black furnace having an outlet for effluent smoke, comprising in combination an unobstructed generally cylindrical substantially uniform internal diameter effluent smoke conduit adapted to be connected in communication with said outlet of said furnace, a water jacket around said conduit on the end adapted to be connected to said furnace, said water jacket having a water outlet adjacent said furnace and a water inlet adjacent the other end of said water jacket, said water jacket containing no water sprays, a water spray in the unjacketed portion of said conduit adjacent said water jacket, and means to supply water to said inlet of said water jacket and to said spray in controlled amounts.

9. A heat exchanger for a carbon black furnace having an outlet for effluent smoke, comprising in combination an unobstructed generally cylindrical substantially uniform internal diameter effluent smoke conduit adapted to be connected in communication with said outlet of said furnace, said conduit comprising a plurality of sections adapted to be secured together, said sections of said conduit being formed of two concentric coextensive pipes sealed together at their ends to provide a closed cylindrical annulus for the reception and passage of water, the annulus of said conduit sections each having an inlet disposed tangentially to the inner wall of said outer concentric pipe at one end and an outlet disposed and connected vertically at the top of the other end of said annulus, the outlet of any section adjacent the inlet of another section being connected thereto, the outlet of the conduit section adapted to be connected to said furnace being adjacent said furnace, the concentric pipes at the end of said conduit section adjacent said furnace being joined by an annular plate covering the entire end wall of said furnace, a sight tube passing through said concentric pipes with its longitudinal axis disposed to enter the chamber of said furnace, a cover for said sight tube, radial reinforcing flanges on said annular plate, expansion joints in the outer ones of said concentric pipes comprising an enlarged annular corrugation, and openings in communication with low points in said annulus covered by removable doors.

10. A heat exchanger for a carbon black furnace having an outlet for effluent smoke, comprising in combination an unobstructed generally cylindrical substantially uniform internal diameter effluent smoke conduit adapted to be connected in communication with said outlet of said furnace, said conduit comprising a plurality of sections adapted to be secured together, said sections of said conduit being formed of two concentric coextensive pipes sealed together at their ends to provide a closed cylindrical annulus for the reception and passage of water, the annulus of said conduit sections each having an inlet disposed tangentially to the inner wall of said outer concentric pipe at one end and an outlet disposed and connected vertically at the top of the other end of said annulus, the outlet of any section adjacent the inlet of another section being connected thereto, the outlet of the conduit section adapted to be conected to said furnace being adjacent said furnace, the concentric pipes at the end of said conduit section adjacent said furnace being joined by an annular plate covering the entire end wall of said furnace, a sight tube passing through said concentric pipes with its longitudinal axis disposed to enter the chamber of said furnace, a cover for said sight tube, and expansion joints in the outer ones of said concentric pipes comprising an enlarged annular corrugation.

11. A heat exchanger for a carbon black furnace having an outlet for effluent smoke, comprising in combination an unobstructed generally cylindrical substantially uniform internal diameter effluent smoke conduit adapted to be connected in communication with said outlet of said furnace, said conduit comprising a plurality of sections adapted to be secured together, said sections of said conduit being formed of two concentric coextensive pipes sealed together at their ends to provide a closed cylindrical annulus for the reception and passage of water, the annulus of said conduit sections each having an inlet disposed tangentially to the inner wall of said outer concentric pipe at one end and an outlet disposed and connected vertically at the top of the other end of said annulus, the outlet of any section adjacent the inlet of another section being connected thereto, the outlet of the conduit section adapted to be connected to said furnace being adjacent said furnace, a sight tube passing through said concentric pipes with its longitudinal axis disposed to enter the chamber of said furnace, a cover for said sight tube, and expansion joints in the outer ones of said concentric pipes comprising an enlarged annular corrugation.

12. A heat exchanger for a carbon black furnace having an outlet for effluent smoke, comprising in combination an unobstructed generally cylindrical substantially uniform internal diameter effluent smoke conduit adapted to be connected in communication with said outlet of said furnace, said conduit comprising a plurality of sections adapted to be secured together, said sections of said conduit being formed of two concentric coextensive pipes sealed together at their ends to provide a closed cylindrical annulus for the reception and passage of water, the annulus of said conduit sections each having an inlet disposed tangentially to the inner wall of said outer concentric pipe at one end and an outlet disposed and connected vertically at the top of the other end of said annulus, the outlet of any section adjacent the inlet of another section being connected thereto, the concentric pipes at the end of said conduit section adjacent said furnace being joined by an annular plate covering the entire end wall of said furnace, a sight tube passing through said concentric pipes with its longitudinal axis disposed to enter the chamber of said furnace, a cover for said sight tube, and expansion joints in the outer ones of said concentric pipes comprising an enlarged annular corrugation.

13. A heat exchanger for a carbon black furnace having an outlet for effluent smoke, comprising in combination an unobstructed generally cylindrical substantially uniform internal diameter effluent smoke conduit adapted to be connected in communication with said outlet of said furnace, said conduit being formed of two concentric coextensive pipes sealed together at their ends to provide a closed cylindrical annulus for the reception and passage of water, the annulus of said conduit having an inlet disposed tangentially to the inner wall of said outer concentric pipe at one end and an outlet disposed and connected vertically at the top of the other end of said annulus, the outlet of the conduit being adjacent said furnace, the concentric pipes at the end of said conduit adjacent said furnace being joined by an annular plate covering the entire end wall of said furnace, a sight tube passing through said concentric pipes with its longitudinal axis disposed to enter the chamber of said furnace, a cover for said sight tube, and expansion joints in the outer one of said concentric pipes comprising an enlarged annular corrugation.

14. A heat exchanger for a carbon black furnace having an outlet for effluent smoke, comprising in combination an unobstructed generally cylindrical substantially uniform internal diameter effluent smoke conduit adapted to be connected in communication with said outlet of said furnace, said conduit being formed of two concentric coextensive pipes sealed together at their ends to provide a closed cylindrical annulus for the reception and passage of water, the annulus of said conduit having an inlet disposed tangentially to the inner wall of said outer concentric pipe at one end and an outlet disposed and connected vertically at the top of the other end of said annulus, the outlet of the conduit being adjacent said furnace, a sight tube passing through said concentric pipes with its longitudinal axis disposed to enter the chamber of said furnace, a cover for said sight tube, and expansion joints in the outer one of said concentric pipes comprising an enlarged annular corrugation.

15. A heat exchanger for a carbon black furnace having an outlet for effluent smoke, comprising in combination an unobstructed generally cylindrical substantially uniform internal diameter effluent smoke conduit adapted to be connected in communication with said outlet of said furnace, said conduit being formed of two concentric coextensive pipes sealed together at their ends to provide a closed cylindrical annulus for the reception and passage of water, the annulus of said conduit having an inlet disposed tangentially to the inner wall of said outer concentric pipe at one end and an outlet disposed and connected vertically at the top of the other end of said annulus, the concentric pipes at the end of said conduit adjacent said furnace being joined by an annular plate covering the entire end wall of said furnace, a sight tube passing through said concentric pipes with its longitudinal axis disposed to enter the chamber of said furnace, a cover for said sight tube, and expansion joints in the outer one of said concentric pipes comprising an enlarged annular corrugation.

16. A heat exchanger for a carbon black furnace having an outlet for effluent smoke, comprising in combination an unobstructed generally cylindrical substantially uniform internal diameter effluent smoke conduit adapted to be connected in communication with said outlet of said furnace, said conduit being formed of two concentric coextensive pipes sealed together at their ends to provide a closed cylindrical annulus for the reception and passage of water, the annulus of said conduit having an inlet disposed tangentially to the inner wall of said outer concentric pipe at one end and an outlet disposed and connected vertically at the top of the other end of said annulus, the outlet of the conduit being adjacent said furnace, the concentric pipes at the end of said conduit adjacent said furnace being joined by an annular plate covering the entire end wall of said furnace, and expansion joints in the outer one of said concentric pipes comprising an enlarged annular corrugation.

References Cited in the file of this patent

UNITED STATES PATENTS 403,644    Brown _____ May 21, 1889

(Other references on following page)

UNITED STATES PATENTS

| | | |
|---|---|---|
| 1,520,115 | Brownlee et al. | Dec. 23, 1924 |
| 1,929,664 | Wilcox | Oct. 10, 1933 |
| 2,091,119 | Saint-Jacques | Aug. 24, 1937 |
| 2,142,734 | Polley | Jan. 3, 1939 |
| 2,378,055 | Wiegand et al. | June 12, 1945 |
| 2,564,700 | Krejci | Aug. 21, 1951 |
| 2,632,713 | Krejci | Mar. 24, 1953 |
| 2,699,836 | Barton | Jan. 18, 1955 |
| 2,705,189 | Ekholm | Mar. 29, 1955 |
| 2,758,666 | Prentiss | Aug. 14, 1956 |
| 2,781,251 | Howell | Feb. 12, 1957 |